United States Patent [19]

Takahata

[11] 4,099,100

[45] Jul. 4, 1978

[54] NEON TUBE FLASHING DEVICE

[75] Inventor: Koichi Takahata, Tokyo, Japan

[73] Assignee: Nippon Kogaku K.K., Tokyo, Japan

[21] Appl. No.: 702,453

[22] Filed: Jul. 6, 1976

[30] Foreign Application Priority Data

Jul. 11, 1975 [JP] Japan .................................. 50-96492

[51] Int. Cl.² ............................................. H05B 41/32
[52] U.S. Cl. ............................... 315/241 P; 315/134; 315/136; 315/151; 315/200 A; 340/636; 340/653
[58] Field of Search ...................... 315/129, 134–136, 315/151, 159, 200 A, 241 P; 354/145; 340/77, 105, 221, 248 A, 248 D, 249

[56] References Cited

U.S. PATENT DOCUMENTS

| 3,648,103 | 3/1972 | Okada | 315/136 |
| 3,822,393 | 7/1974 | Karpol | 315/241 P |
| 3,898,514 | 8/1975 | Takahashi | 315/136 |
| 3,979,639 | 9/1976 | Adams, Jr. | 315/241 P |
| 3,993,929 | 11/1976 | Dick et al. | 315/241 P |

*Primary Examiner*—Eugene R. LaRoche
*Attorney, Agent, or Firm*—Shapiro and Shapiro

[57] ABSTRACT

A neon tube flashing device having a neon tube which emits light upon application of a predetermined voltage thereto to effect indication of operational conditions comprises a capacitor parallel-connected to the neon tube, and switch means series-connected to the capacitor and parallel-connected to the neon tube. The neon tube may be caused to effect flashing by charging-discharging of the capacitor during conduction of the switch means.

14 Claims, 2 Drawing Figures

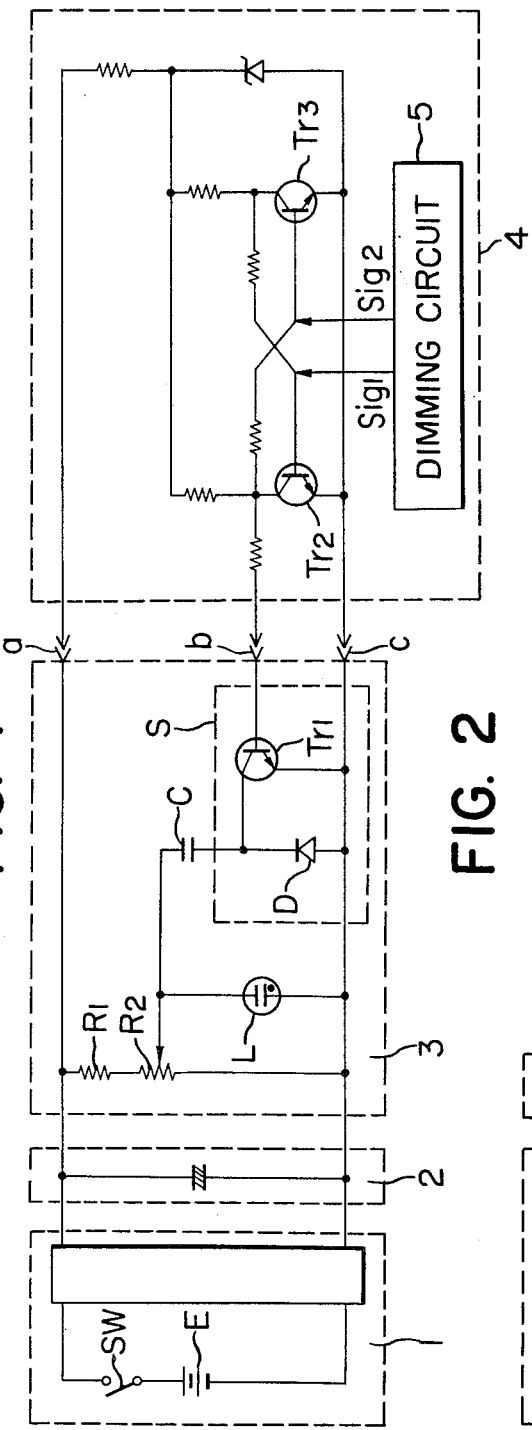
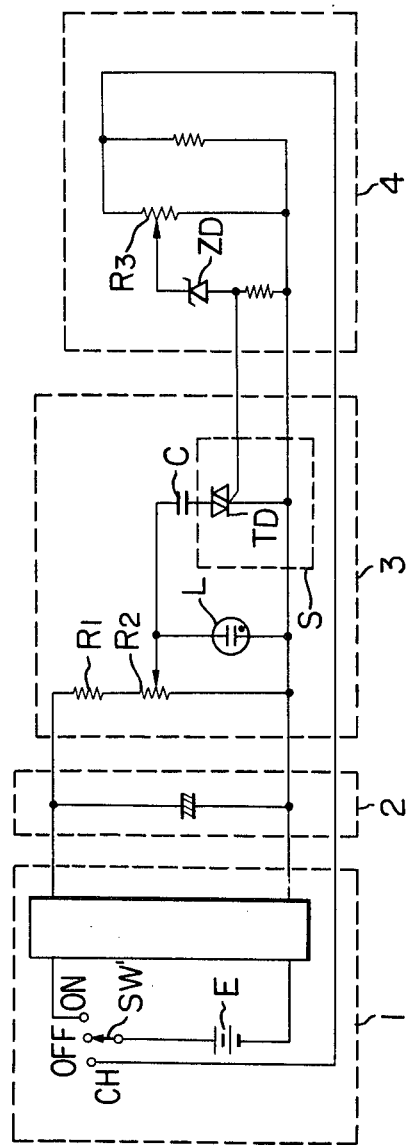
FIG. 1
FIG. 2

NEON TUBE FLASHING DEVICE

BACKGROUND OF THE INVENTION

1. Field of the Invention

This invention relates to a neon tube flashing circuit in various devices such as speed lights or the like having a neon tube for indicating whether or not the charging voltage in a main capacitor has reached a level for which light emission may take place, and more particularly to such a neon tube flashing circuit which further enables the neon tube to effect flashing.

2. Description of the Prior Art

Among the recent speed lights (electronic flash discharge light emitters), some are of the automatic dimming type (AUTO) and some are of the type which permits various kinds of change-over such as selective change-over of the dimming range, change-over of the quantity of light emitted, change-over from single lamp to multiple lamps and change-over from standard irradiation to wide angle irradiation. However, the neon tube (pilot lamp) in the speed light has indicated the ready-to-emit-light condition by either being turned on or turned off.

SUMMARY OF THE INVENTION

It is an object of the present invention to provide a neon tube flashing circuit in devices such as speed lights or the like which may cause the neon tube to turn on and flash by a simple construction and which is thus applicable for the various purposes mentioned above.

A feature of the present invention is that a series circuit of a capacitor and a switching element is parallel-connected to the neon tube for effecting indication when the main capacitor has reached a voltage level for which light emission may take place. The neon tube is designed to flash only when the switching element is in conductive state.

The invention will become more fully apparent from the following detailed description thereof taken in conjunction with the accompanying drawings.

BRIEF DESCRIPTION OF THE DRAWINGS

FIG. 1 is a diagram of the electric circuit according to a first embodiment of the present invention.

FIG. 2 is a diagram of the electric circuit according to a second embodiment of the present invention.

DESCRIPTION OF THE PREFERRED EMBODIMENTS

Embodiments of the present invention will hereinafter be described with reference to FIGS. 1 and 2.

FIGS. 1 and 2 are diagrams of the electric circuits for a speed light in which the trigger section and flash discharge tube are not shown.

In FIGS. 1 and 2, a power source section 1 comprises a DC-DC converter including a main switch SW or SW' and a power supply battery E.

A main capacitor 2 serves to effect discharging and light-emission of an unshown flash discharge tube. A lamp light-emitting section 3 includes voltage dividing resistors R1 and R2 for the main capacitor 2 and a neon tube L for indicating the ready-to-emit-light voltage of the main capacitor 2. Further, a series circuit of a flashing capacitor C and a switching element S is parallel-connected to the neon tube L. A flash control section 4 serves to control charging-discharging of the flashing capacitor C.

FIG. 1 shows a first embodiment of the present invention as applied to the dimming checker device for an automatic dimming speed light. This embodiment employs a combination of a transistor Tr1 and a diode D as the switching element S, and a combination of a dimming circuit and a flip-flop circuit as the flash control section 4.

More specifically, the collector of the transistor Tr1 and the cathode of the diode D are connected to the flashing capacitor C, and the emitter of the transistor Tr1 and the anode of the diode D are connected to the negative terminal of the power source. The base of the transistor Tr1 is connected through a resistor to the collector of a transistor Tr2 in a conventional flip-flop circuit. A light-emission starting signal Sig. 1 is applied from the dimming circuit 5 to the base of the transistor Tr2, and an end-of-dimming signal Sig. 2 is applied from the same dimming circuit 5 to the base of a transistor Tr3.

When the main switch SW is closed, the main capacitor 2 is charged until a discharge starting voltage is reached, whereupon the neon tube L is turned on. When a trigger switch (not shown) in the trigger section is then closed, the flash discharge tube emits light and the main capacitor 2 discharges while the neon tube L is turned off. At the same time, the dimming circuit 5 applies the light-emission starting signal Sig. 1 to the base of the transistor Tr2 to render this transistor conductive and render the transistor Tr1 of the switching element S nonconductive. Thus, the charging circuit for the capacitor C in the lamp light-emitting section 3 becomes disconnected.

When the light from the discharge tube is reflected by a subject and applied to the dimming circuit 5, this circuit applies the end-of-dimming signal Sig. 2 to the base of the transistor Tr3 to thereby render conductive this transistor Tr3 and the transistor Tr1 of the switching element S.

Thus, the power source section 1, the voltage dividing resistors R1, R2, the capacitor C and the transistor Tr1 together constitute a charging circuit. The potential across the capacitor C rises in accordance with the time constant of the voltage dividing resistors R1, R2 and the capacitor C and reaches the discharge starting voltage for the neon tube L, whereupon the neon tube L is turned on to thereby form a discharging circuit comprising the capacitor C, the neon tube L and the diode D, so that the potential across the capacitor C starts to drop. When the potential across the capacitor C drops below the holding voltage for the neon tube L, the neon tube L is turned off and the capacitor C again starts to be charged. The neon tube L repeats such flashing operation until the transistor Tr1 of the switching element S is rendered nonconductive, that is, until the light-emission starting signal Sig. 1 is applied to the base of the transistor Tr2 in the flop-flip circuit, thus indicating that dimming has been done.

Whenever no dimming has been done, the end-of-dimming signal Sig. 2 is not produced and the transistor Tr1 of the switching element S thus remains nonconductive to permit no charging-discharging of the flashing capacitor C, so that no flashing of the neon tube L occurs.

FIG. 2 shows a second embodiment of the present invention as applied to a battery checker for the power source used in a speed light.

The main switch SW' in the power source section comprises a three-step change-over switch. Zener diode (constant voltage element) ZD has its cathode connected to the voltage dividing point of a voltage dividing resistor R3 having its opposite ends connected to the checker side contact CH of the switch SW' and the negative terminal of the power source, and has its anode connected through a resistor to the negative terminal of the power source E.

A triac (bidirectional control commutator element) TD is employed as the switching element S and the gate thereof is connected to the anode of the Zener diode ZD.

When the switch SW' is selected to the checker side contact CH to check the voltage of the power source E in use, the source voltage is applied to the Zener diode ZD. If the voltage across the Zener diode ZD is at a predetermined value or above, the diode ZD is conductive and the triac TD is also conductive.

Thus, there is formed a charging circuit comprising the power source section 1, the voltage dividing resistors R1, R2, the capacitor C and the triac TD.

The discharging circuit for the capacitor C is formed by the capacitor C, the neon tube L and the triac TD.

In the same manner as described with respect to the first embodiment, the flashing of the neon tube L is repeated as the result of charging-discharging.

That is, the neon tube effects flashing only when the voltage across the power supply battery E is above a certain value.

Now, in FIG. 1, let the positive terminal of the lamp light-emitting section 3 be terminal a, the base of the transistor Tr1 of the switching element S be terminal b and the negative terminal of the lamp light-emitting section 3 be terminal c. If, instead of the flip-flop circuit and the dimming circuit 5, a switch as the flash control section 4 is connected between the terminals a and b, the flashing of the neon tube L will occur only when the switch is closed. Therefore, if this switch is operatively associated with various kinds of change-over such as change-over of the quantity of light emitted, change-over of dimming range, change-over from normal light-emission to modulated light-emission, change-over from AUTO (automatic dimming) to MANUAL, change-over from standard irradiation to wide angle irradiation and change-over from single lamp to multiple lamps, then the neon tube L may be caused to flash in accordance with any of these various purposes. Also, if, as the flash control section 4, a voltage detector circuit comprising voltage dividing resistors and constant voltage elements is connected to the terminals a, b, c of the lamp light-emitting section 3 as is the case with the above-described change-over effected by the switch and if the detection voltage is preselected to a level above the light-emission starting voltage for the neon tube L, then the voltage of the main capacitor 2 may be indicated at two steps, namely, from turn-on to flashing.

According to the present invention, as has been described above, a simple construction in which a series circuit of a capacitor and a switching element is parallel-connected to a neon tube enables the neon tube to assume three conditions, i.e. turn-off, turn-on and flashing and readily permits selective indication to be carried out for check-up of dimming, battery checker, change-over of the quantity of light, change-over of dimming range, change-over from standard to wise angle irradiation, MANUAL-AUTO change-over, change-over from normal light-emission to modulated light-emission, change-over from single lamp to multiple lamps, etc.

I claim:

1. A system in which a single indicator device is used to indicate a plurality of conditions, said system comprising a source of voltage, an indicator device which emits light only when the voltage applied thereto exceeds a certain threshold, means connecting said indicator device to said source and causing said device to emit light continuously when a first condition is present, namely, when the voltage of said source exceeds said threshold, and means for causing said indicator device to emit light intermittently in response to a second condition, the last-mentioned means including a capacitor and an electronic switch connected in series across said indicator device, said switch having a triggering electrode which renders said switch conductive when a signal designating the presence of said second condition is applied to said electrode.

2. A system in accordance with claim 1, wherein said source of voltage is a main capacitor for a flash discharge tube and said indicator device is a neon lamp.

3. A system in accordance with claim 2, wherein said switch is a transistor providing a charging path for the first-mentioned capacitor, and further comprising a diode connected between the emitter and the collector of said transistor and providing a discharge path for the first-mentioned capacitor when the neon lamp emits light.

4. A system in accordance with claim 2, wherein the switch is a triac.

5. A system in accordance with claim 2, wherein said signal is produced by a dimming circuit which regulates the quantity of light produced by said flash discharge tube.

6. A system in accordance with claim 2, wherein said main capacitor is charged by a battery and said signal is produced by a circuit responsive to the voltage of said battery.

7. A system in accordance with claim 6, wherein said circuit comprises a manual switch having a first position in which the battery is connected to said main capacitor and a second position in which the battery is connected to a voltage detector circuit which produces said signal when the battery voltage exceeds a certain level.

8. In a flash device having a flash discharge tube, a main capacitor applying a voltage to the flash discharge tube and a light-emitting element which emits light when the charging voltage of the main capacitor reaches a level for which the flash discharge tube can emit light, the flash device being so designed that when light reflected from a scene reaches a predetermined level the emission of the flash discharge tube is stopped, the improvement comprising:
 a flashing capacitor and an electronic switch means connected in series across the light-emitting element; and
 a control means for rendering the switch means conductive in response to reflected light from the scene.

9. A device according to claim 8, wherein the control means renders the switch means non-conductive when the flash discharge tube emits light.

10. A device according to claim 9, wherein the control means comprises:
 a dimming means generating a first signal when the flash discharge tube emits light and generating a second signal in response to said reflected light; and a means for driving the switch means in response to the first and second signals.

11. A device according to claim 10, wherein the switch means includes a charge circuit which is driven by the driving means and which can be rendered conductive in a direction to charge the flashing capacitor to cause the light-emitting element to emit light and a discharge circuit which is connected in parallel with the charge circuit and which discharges the flashing capacitor when the light-emitting element emits light.

12. A device according to claim 11, wherein the charge circuit includes a transistor having its collector-emitter path connected in series with the flashing capacitor and its base connected to the driving means.

13. A device according to claim 12, wherein the discharge circuit includes a diode connected across the collector-emitter path of the transistor.

14. A device according to claim 10, wherein the driving means includes a flip-flop circuit having first and second transistors connected to the dimming means so that the bases of the first and second transistors can receive the first and second signals, respectively, the collector of the first transistor being connected to the switch means.

* * * * *